United States Patent

Toyoda et al.

[11] Patent Number: 5,993,581
[45] Date of Patent: Nov. 30, 1999

[54] ADHESIVE COMPOSITION FOR BONDING A LINING TUBE ON TO THE INTERNAL SURFACE OF AN EXISTING PIPE

[75] Inventors: Shigeru Toyoda, Saitama-ken; Shuichi Yagi, Kanagawa-ken; Masaaki Itagaki, Kanagawa-ken; Yukio Sato, Kanagawa-ken; Kiyoshi Shinkado, Tokyo, all of Japan

[73] Assignees: Tokyo Gas Co., Ltd., Tokyo; Three Bond Co., Ltd., Hachiohji; Three Bond Unicom Co., Ltd., Tokyo, all of Japan

[21] Appl. No.: 09/050,027

[22] Filed: Mar. 30, 1998

Related U.S. Application Data

[62] Division of application No. 08/788,843, Jan. 27, 1997, abandoned.

[30] Foreign Application Priority Data

Mar. 5, 1996 [JP] Japan .................................... 8-047777

[51] Int. Cl.⁶ .............................. B32B 35/00; F16L 55/18
[52] U.S. Cl. ........................... 156/94; 156/330; 156/294; 138/97
[58] Field of Search .............................. 156/94, 294, 325, 156/330; 138/97, 98; 29/402.01, 402.09

[56] References Cited

U.S. PATENT DOCUMENTS

| | | | |
|---|---|---|---|
| 4,252,658 | 2/1981 | Tasaka et al. | 508/131 |
| 4,456,401 | 6/1984 | Williams | 138/97 X |
| 4,581,085 | 4/1986 | Wood | 138/97 X |
| 4,661,539 | 4/1987 | Goel . | |
| 4,866,108 | 9/1989 | Vachon et al. . | |
| 4,972,880 | 11/1990 | Strand | 138/98 |
| 5,252,632 | 10/1993 | Savin . | |
| 5,435,842 | 7/1995 | Mukaida et al. . | |
| 5,855,712 | 1/1999 | Toyoda et al. | 156/94 |

FOREIGN PATENT DOCUMENTS

| | | |
|---|---|---|
| 0256140 | 2/1988 | European Pat. Off. . |
| 0459614A2 | 12/1991 | European Pat. Off. . |
| 58-49771 | 3/1983 | Japan . |
| 59-172570 | 9/1984 | Japan . |
| 63-112628 | 5/1988 | Japan . |
| 04332754 | 11/1992 | Japan . |
| 06128548 | 5/1994 | Japan . |

OTHER PUBLICATIONS

WPAT accession No. 88–173086 for Japanese Patent No. 63–112628, Nitto Boawki KK.
WPAT accession No. 94–189182/23 for Japanese Patent No. 61–128548, Sekisui Chem Ind Co. Ltd.

*Primary Examiner*—Michael W. Ball
*Assistant Examiner*—Shawn A. Mitchell
*Attorney, Agent, or Firm*—Nikaido, Marmelstein, Murray & Oram LLP

[57] ABSTRACT

There is provided an adhesive composition for use as an adhesive agent for bonding a flexible lining tube on to the internal surface of an existing old pipe. Such an adhesive composition comprises: a) an epoxy resin; b) a thixotropy agent mainly containing silica fine particles; c) a lubricant mainly containing spheroidal fine particles; d) a curing agent having a sufficient compatibility with the thixotropy agent, and being used in a sufficient amount to cure the epoxy resin. In particular, the above components a),b),c) together form a main agent, and the above components b) and d) together form an auxiliary agent. Before use, the main agent and the auxiliary agent are separated from each other. When in use, the main agent and the auxiliary agent are mixed together, so as to form the adhesive composition for use as an adhesive agent for bonding a flexible lining tube on to the internal surface of the existing old pipe.

20 Claims, 3 Drawing Sheets

ADHESIVE COMPOSITION FOR BONDING A LINING TUBE ON TO THE INTERNAL SURFACE OF AN EXISTING PIPE

This application is a divisional of application Ser. No. 08/788,843, filed Jan. 27, 1997, now abandoned.

BACKGROUND OF THE INVENTION

The present invention relates to an adhesive composition, in particular to an adhesive composition for bonding a lining tube on the internal surface of an existing old pipe such as an existing gas pipe, water pipe, etc. so as to repair the same.

People have found that if an existing old pipe is treated by bonding a flexible lining tube to the internal surface thereof, such a treated existing old pipe will have a sufficient air-tight property and will be very strong in preventing pipeline leakage and/or earthquake damage.

For example, there has been known a method of repairing an existing underground gas pipe by reversing a flexible lining tube into the pipe without trenching on road surface along the pipe. According to such a method, at first, a belt is introduced into an existing pipe so that one part of the belt is extending through the pipe over the entire length thereof. Then, another part of the belt is introduced into a flexible lining tube so that this part of the belt is extending through the lining tube along the entire length thereof. Afterwards, a necessary amount of adhesive agent is sealed into the lining tube, and one end of the lining tube is reversed to be fixed at one open end of the existing pipe. Subsequently, a pressurized fluid is applied from behind to continuously cause the reversal of the lining tube in the existing pipe, so that the lining tube may be introduced into the pipe and the reversed lining tube may be bonded on to the internal surface thereof. Such reversal and introduction of the lining tube into the existing pipe can be effectively directed by pulling the above belt introduced in advance into the existing pipe. In this way, the lining tube reversed in the existing pipe can adhere to the pipe internal surface by virtue of the adhesive agent and the pressurized fluid being applied from behind.

The lining tube adhered to the internal surface of the existing pipe is usually made of a flexible gas-impermeable material, therefore it is effective in repairing any corrosion holes and is also effective in preventing any possible damages caused due to an earthquake or the like. However, since the above method involves too many preparation steps before the operation of reversing and introducing a lining tube into an existing pipe, a time period required in the whole pipe repairing process is relatively long and hence the cost for repairing an existing pipe is comparatively high.

In order to overcome the above problem, Japanese Patent Publication 61-20411 has suggested an improved method as shown in FIG. 3. In the process of FIG. 3, at first, a leading block c is introduced into an existing pipe a through an open end b thereof, then an adhesive agent d is introduced into the existing pipe a. Subsequently, one end of a lining tube e is reversed to be fixed at the open end b of the existing pipe a. Afterwards, a pressurized fluid is applied from behind, as shown by an arrow g to continuously cause the reversal of the lining tube e, so that the lining tube e may be introduced into the existing pipe a. At the same time, the leading block c is pulled forward by a towing wire f, facilitating the forward movement of the adhesive agent d and reversing movement of the lining tube e. In this way, the lining tube e can adhere to the internal surface of the existing pipe a by means of the adhesive agent d and pressurized fluid g being applied from behind.

In the process shown in FIG. 3, the leading block c is used to prevent the adhesive agent d from moving too fast to ensure that the internal surface of the existing pipe a may be exactly coated with the adhesive agent d.

Although a process of FIG. 3 is allowed to dispense with some preparation steps before the operation of reversing a lining tube into an existing pipe, there is still a problem which can be concluded as follows.

Firstly, since the adhesive agent used in the process shown in FIG. 3 is usually an epoxy resin which has been found to have a relatively great friction resistance between pipe internal wall and the lining tube e, it is often difficult for the lining tube e to be smoothly reversed and moved forward through the pipe a over the entire length thereof. For this reason, in each such a process, the leading block c is required to be pulled forward by a towing wire f. Thus, it is necessary for the wire f to be in advance introduced into the existing pipe over the entire length thereof, and a towing apparatus is needed to pull the wire f to cause the leading block c to move forward. As a result, more equipment is needed and the whole repairing process becomes complicated.

Secondly, because the adhesive agent used in the process shown in FIG. 3 is usually an epoxy resin which has been found to have a relatively great friction resistance between pipe internal wall and the lining tube e, it is often difficult for the lining tube e to be smoothly reversed and moved forward through the pipe a, especially when the lining tube e arrives at a bent portion of the pipe. As a result, the lining tube e will get stuck and become unmovable at the bent portion of the existing pipe, causing the whole repairing operation to be undesirably stopped.

In fact, during the process shown in FIG. 3, if the leading block c is not pulled forward by a towing wire f which requires a towing apparatus, then a further stronger and more energetic pressurized fluid g is required to be applied from behind, thus requiring a pressurizing equipment of further larger scale.

SUMMARY OF THE INVENTION

It is an object of the present invention to provide an improved adhesive composition for use as an adhesive agent which permits a more smooth reversing movement of a lining tube in an existing old pipe to be repaired, ensuring a more effective adhesion of a lining tube to the internal surface of the existing pipe, so as to solve the above-mentioned problems peculiar to the above-mentioned prior arts.

According to the present invention, there is provided an improved adhesive composition for use as an adhesive agent for bonding a flexible lining tube on to the internal surface of an existing old pipe. Such an adhesive composition comprises: a) an epoxy resin; b) a thixotropy agent mainly containing silica fine particles; c) a lubricant mainly containing spheroidal fine particles; d) a curing agent having a sufficient compatibility with the thixotropy agent, and being used in a sufficient amount to cure the epoxy resin.

In particular, upon mixing together the above components a)–d), a mixture thus obtained has a viscosity of 5000–50000 centipoise, a thixotropy index of 1.0–4.0, a sliding resistance of 2.5 or less.

In detail, the epoxy resin is a bisphenol A type epoxy resin, or a bisphenol F type epoxy resin, or a mixture thereof. The curing agent includes either an aliphatic polyamine or an alicyclic polyamine, or both. The lubricant mainly contains spheroidal fine particles having an average diameter of 1000 μ or less.

In further detail, the above components a),b),c) together form a main agent, and the above components b) and d) together form an auxiliary agent, before use the main agent and the auxiliary agent are separated from each other, when in use the main agent and the auxiliary agent are mixed together so as to form the adhesive composition for use as an adhesive agent for bonding a flexible lining tube on to the internal surface of the existing old pipe.

The above objects and features of the present invention will become more understood from the following description with reference to the accompanying drawings.

DETAILED DESCRIPTION OF THE PREFERRED EMBODIMENTS

Figure 1:
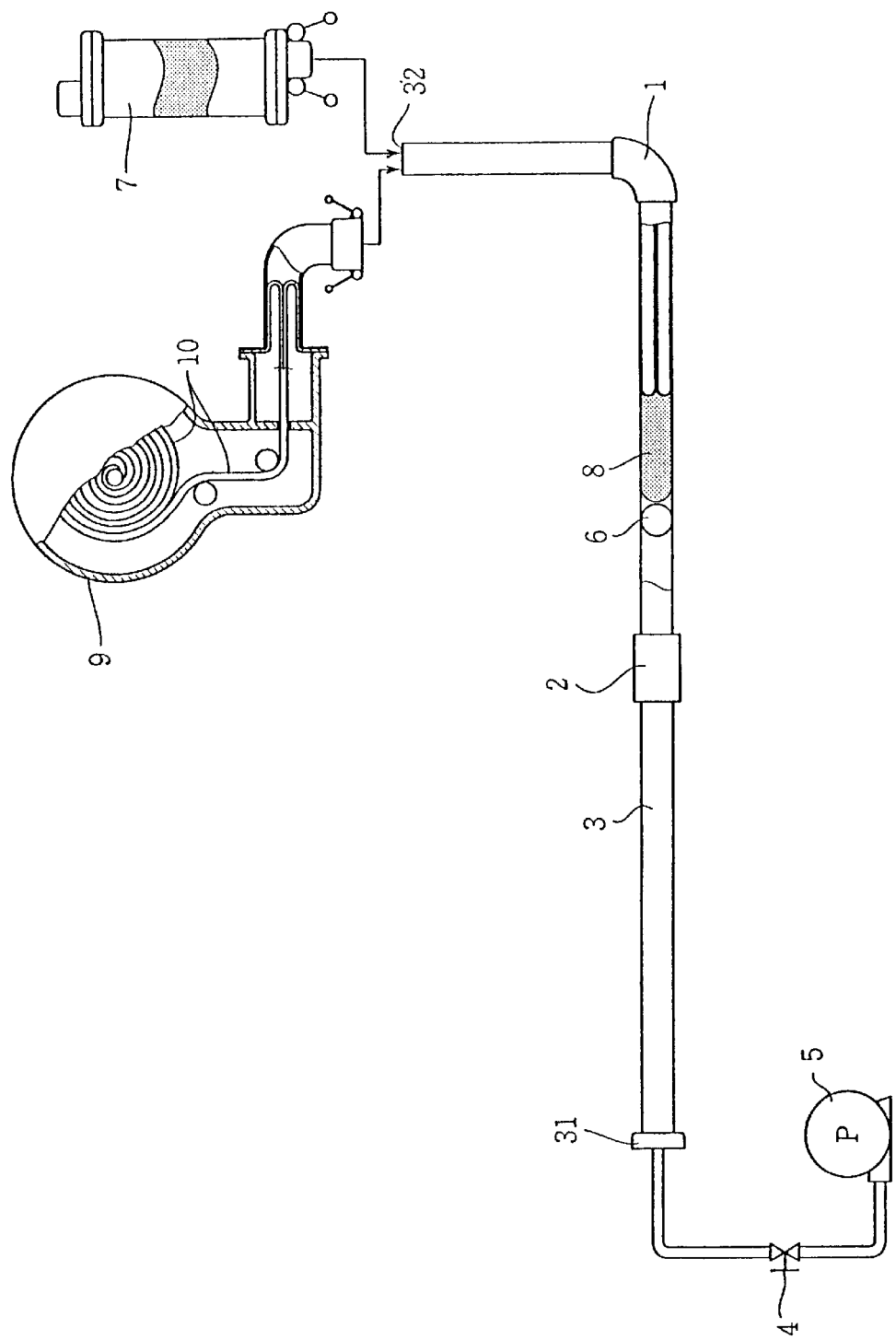
FIG. 1 is an explanatory view showing a process for repairing an existing underground gas pipe by reversing a flexible lining tube into the pipe, and bonding the reversed lining tube on to the pipe internal wall using an adhesive composition of the present invention as an adhesive agent.

The adhesive composition of the present invention comprises: a) an epoxy resin; b) a thixotropy agent mainly containing silica fine particles; c) a lubricant mainly containing spheroidal fine particles; d) a curing agent which has a sufficient compatibility with the above component b) and is used in a sufficient amount to cure the above component a).

In particular, upon mixing the above components a)–d) together, a mixture thus obtained has a viscosity of 5000–50000 centipoise, a thixotropy index of 1.0–4.0, a sliding resistance of 2.5 or less. Preferably, upon mixing the components a)–d) together, a mixture thus obtained should have a thixotropy index of 1.2–2.0, and a sliding resistance of 1.5 or less.

If the above-mentioned viscosity is less than 5000 centipoise and the above-mentioned thixotropy index is less than 1.0, a mixture thus obtained will have an undesirably high flowability, i.e., this will present a problem that an adhesive composition consisting of such a mixture, when serving as an adhesive agent disposed between a reversed lining tube and pipe internal wall, will flow downwardly to the bottom area of a horizontally arranged existing pipe, resulting in here and there undesired spaces between the outer surface of a reversed lining tube and pipe internal wall.

On the other hand, if the above-mentioned viscosity is greater than 50000 centipoise, the above-mentioned thixotropy index is greater than 4.0, and the above-mentioned sliding resistance is greater than 2.5, a mixture thus obtained will have an undesirably low flowability, presenting a problem that an adhesive composition consisting of such a mixture, when serving as an adhesive agent being moved through an existing pipe, hamper the reversing movement of a lining tube in the pipe, especially in a bent portion such as an elbow involved in the existing pipe.

The above-mentioned viscosity is measured at a temperature of 20 ° C. with the use of a BM type viscometer. The above-mentioned thixotropy index (TI) is determined in accordance with Japan Industrial Standard 6833, as a value calculated according to a ratio of an apparent viscosity at a minimum rotating speed to an apparent viscosity at a maximum rotating speed. The above-mentioned sliding resistance is a sliding coefficient obtained under a condition where the adhesive composition of the present invention is disposed between two pieces of testing materials.

The epoxy resin to be incorporated in the adhesive composition of the present invention may be a bisphenol A type epoxy resin, a bisphenol F type epoxy resin, a novolac type epoxy resin, a cyclic aliphatic epoxy resin, or a glycidyl ester type epoxy resin. However, it is preferable to use either a bisphenol A type epoxy resin or a bisphenol F type epoxy resin. In fact, the above-mentioned epoxy resins may be used either alone or in combination. Further, it is also possible that the viscosity of an epoxy resin (in solid form under room temperature) can be adjusted through dilution using a diluent having an epoxy radical as a functional group.

Further, the above-mentioned thixotropy agent mainly contains silica fine particles. Such kind of silica fine particles is an anhydrous silica in an extremely fine particle form obtained through gas-phase reaction of a volatile silicon-containing compound. Several examples of such a silica fine particles are as follows which are commercially available under trade names of AEROSIL#200, AEROSIL#972, AEROSIL#202, AEROSIL#974, AEROSIL#805, manufactured by JAPAN AEROSIL CO., LTD. In fact, such kind of a silica fine particles is mixed with an epoxy resin only for providing a desired thixotropy property for thus obtained adhesive composition. In practice, silica fine particles may be added in an amount of 0.1–10 parts by weight with respect to 100 parts by weight of an epoxy resin, but such an amount may be varied in view of the actual properties of the epoxy resin used. In addition, it is also possible that the silica fine particles, when in use, may be mixed with a kind of filler such as carbon, bentonite or calcium carbonate.

The above-mentioned lubricant mainly contains a kind of spheroidal fine particles which is preferably in a hollow spheroidal form. Such spheriodal fine particles may be produced by heating/foaming a volcanic ash soil. After mixing with the epoxy resin, the hollow spheroidal fine particles will float upwardly, exhibiting good difusing and distributing properties.

Several examples of such a hollow spheroidal fine particles are as follows which are commercially available under trade names of SANKILITE Y02, SANKILITE B03, SANKILITE Y04, manufactured by SANKI CHEMICAL ENGINEERING & CONSTRUCTION CO., LTD., FILITE FG manufactured by JAPAN FILITE CO., LTD., FLOW BEEDS FG 801-NN manufacture by SUMITOMO SEIKA CO.,LTD., TOSHIBA GLASS BEEDS GB731BPN manufactured by TOSHIBA BAROTEENI CO., LTD.

Further, the above-mentioned hollow spheroidal fine particles are required to have an average diameter of 1000 $\mu$ or less, preferably 300 $\mu$ or less. If the hollow spheroidal fine particles have an average diameter greater than 1000 $\mu$, a relatively long time period will be needed to have it completely mixed with an epoxy resin. In addition, the hollow spheroidal fine particles should have a specific gravity which is substantially the same as that of an epoxy resin, so that it may be more easily mixed with the epoxy resin.

The curing agent to be incorporated in the adhesive composition of the present invention, may be an aliphatic polyamine, an alicyclic polyamine, a modified polyamide amine, an aromatic polyamine, or a polymercaptan. However, in order to provide a low viscosity and a low sliding resistance for an adhesive composition as a final product, it is preferable to use either an aliphatic polyamine or an alicyclic polyamine.

The above-described respective components may be added together in accordance with the following proportions to form an adhesive composition of the present invention.

a) an epoxy resin: 100 parts by weight b) a thixotropy agent mainly containing silica fine particles: 0.1–10 parts by weight c) a lubricant mainly containing a spheroidal fine particles: 1–10 parts by weight d) a curing agent having a sufficient compatibility with the above component b):
a sufficient amount to cure the above component a).

Here, the mixing ratio of component b) (thixotropy agent) to component c) (lubricant) is (10–100 parts by weight)/(100 parts by weight), preferably (10–50 parts by weight)/(100 parts by weight). If an amount of thixotropy agent is too small, a mixture thus obtained will have an undesirably high flowability, i.e., this will present a problem that an adhesive composition consisting of such a mixture, when serving as an adhesive agent disposed between a reversed lining tube and pipe internal wall, will flow downwardly to the bottom area of a horizontally arranged existing pipe, resulting in some undesired spaces between the outer surface of a reversed lining tube and pipe internal wall. On the other hand, if an amount of thixotropy agent is too large, an undesirably high thixotropy will occur, resulting in a bad slidability for the adhesive composition. However, if an amount of lubricant (spheroidal fine particles) is too large, there will also be too high a thixotropy property, which in turn will cause a bad slidability for a finally obtained adhesive composition. On the other hand, if an amount of the lubricant (spheroidal fine particles) is too small, there will be too great a sliding resistance for the adhesive composition, resulting in a bad movability of the adhesive agent when moving through an existing pipe.

Further, with the composition of the present invention, the above components a),b),c) together form a main agent, and the above components b) and d) together form an auxiliary agent. Prior to use, the main agent and the auxiliary agent are separated from each other. When in use, the main agent and the auxiliary agent are mixed together so as to form a desired adhesive composition for use as an adhesive agent for bonding a flexible lining tube on to the internal surface of an existing old pipe.

In detail, upon mixing components a)–d) together, i.e., upon mixing the main agent and the auxiliary agent together, a mixture thus obtained has a viscosity of 5000–50000 centipoise, a thixotropy index of 1.0–4.0, a sliding resistance of 2.5 or less, preferably 1.5 or less.

The preparation of the adhesive composition of the present invention may be performed in a following manner.

At first, 100 parts by weight of a) an epoxy resin, 0.1–10 parts by weight of b) an silica fine particles, 1–10 parts by weight of c) spheroidal fine particles, are added together and then mixed in a Bumbury Mixer or the like to form the above-mentioned main agent which is a mixture in a homogeneous liquid state. Meanwhile, a predetermined amount of b) an silica fine particles is added and kneaded into a predetermined amount of d) a curing agent, so as to produce the above-mentioned auxiliary agent. When in use, the main agent and the auxiliary agent are mixed together to obtain a desired adhesive composition for use as an adhesive agent for bonding a flexible lining tube on to the internal surface of an existing old pipe.

In addition, it is found that the main agent and the auxiliary agent may be mixed together more easily and completely by providing substantially the same viscosity and thixotropy for both the main agent and the auxiliary agent.

Further, according to the present invention, it is allowable to add various known additives to the adhesive composition. For instance, in order to adjust the viscosity of the adhesive composition, it is possible to add a viscosity regulating agent. In addition, a pigment or dyestuff may be added to provide a color for the adhesive composition, an antifoaming agent may be added to prevent an undesired foaming of the adhesive composition.

It has been found by the inventors of the present invention that the viscosity, thixotropy and sliding friction resistance of an adhesive composition will have a great influence on the workability of a process in which the adhesive composition is used as an adhesive agent for bonding a lining tube on to the internal surface of an existing old pipe. Therefore, by adding a thixotropy agent mainly containing silica fine particles and a lubricant mainly containing a spheroidal fine particles into a conventional adhesive composition, the viscosity, thixotropy and sliding friction resistance of an adhesive composition may be exactly adjusted to some desired correct levels, thereby ensuring an improved workability of the process for repairing an existing old pipe.

Particularly, since a lubricant is incorporated into the adhesive composition, the sliding resistance of the adhesive composition (when disposed between the lining tube and existing pipe internal wall) has been greatly reduced. As a result, when the reversing portion of a lining tube arrives at a bent portion of an existing pipe, the lining tube will smoothly pass therethrough without getting stuck in such a bent portion.

Several examples indicating the ingredients of the adhesive composition of the present invention will be given below with reference to the following working examples and comparative examples.

EXAMPLE 1

Main Agent (bisphenol A type epoxy resin) (EPIKOTE 828, manufactured by YUKA SHELL EPOXY KABUSHIKI KAISHA): 100.0 parts by weight Curing Agent (modified aliphatic polyamine) (VERSAMINE 1–376, manufactured by HENKEL JAPAN CORPORATION):

45.0 parts by weight

Curing Agent (modified alicyclic polyamine) (ANCAMINE 1882, manufactured by ACI JAPAN CORPORATION):

15.0 parts by weight

Thixotropy Agent (silica fine particles) (AEROSIL #200, manufactured by NIPPON AEROSIL CO., LTD):

2.0 parts by weight

Lubricant (glass beads) (GB731BPN, manufactured by TOSIHIBA BALLOTINI CO., LTD.):

2.0 parts by weight

EXAMPLE 2

Example 2 is almost the same as Example 1 except that a lubricant is different from that used in Example 1. Therefore, only a lubricant used in this Example is listed below.

Lubricant (an alumino silicate hollow spheroidal filler) (FERRITE FG, manufactured by NIPPON FERRITE CO., LTD ):

2.0 parts by weight

EXAMPLE 3

Example 3 is almost the same as Example 1 except that a lubricant is different from that used in Example 1. Therefore, only a lubricant used in this Example is listed below.

Lubricant (a shirasu hollow spheroidal filler) (SANKILITE Y04, manufactured by SANKI CHEMICAL ENGINEERING & CONSTRUCTION CO., LTD.): 2.0 parts by weight

EXAMPLE 4

Example 4 is almost the same as Example 1 except that a lubricant is different from that used in Example 1. Therefore, only a lubricant used in this Example is listed below.

Lubricant (a polyethylene powder filler) (FLOWBEADS FG801-NN, manufactured by SUMITOMO SEIKA CORPORATION): 2.0 parts by weight

Comparative Example 1

Diluted Bisphenol F Type Epoxy Resin (EP4900, manufactured by ASAHI DENKA KYOGYO CORPORATION):

100.0 parts by weight

Curing Agent (modified alicyclic polyamine) (VERSAMINE C-30, manufactured by HENKEL JAPAN CORPORATION):

30.0 parts by weight

Curing Agent (aromatic polyamine): (ANCAMINE LV, manufactured by ACI JAPAN CORPORATION):

30.0 parts by weight

Thixotropy Agent (silica fine particles) (AEROSIL #200, manufactured by NIPPON AEROSIL CO., LTD):

1.5 parts by weight

Lubricant (inorganic foamed spheroidal filler) (PEARLITE, manufactured by TOHO PEARLITE CO., LTD):

2.0 parts by weight

Coloring Agent (cyanine blue): 0.2 parts by weight

Comparative Example 2

Bisphenol A Type Epoxy Resin (EPIKOTE 828, manufactured by YUKA SHELL EPOXY KABUSHIKI KAISHA): 100.0 parts by weight Curing Agent (modified aliphatic polyamine) (VERSAMINE I-376, manufactured by IIENKEL JAPAN CORPORATION):

45.0 parts by weight

Curing Agent (modified alicyclic polyamine) (ANCAMINE 1882, manufactured by ACI JAPAN CORPORATION):

15.0 parts by weight

Thixotropy Agent (silica fine particles) (AEROSIL R202, manufactured by NIPPON AEROSIL CO., LTD):

3.0 parts by weight

Lubricant (hollow plastic micro-filler) (EXPANCEL DE, manufactured by NIPPON FERRITE CO.,LTD):

5.0 parts by weight

Coloring Agent (cyanine blue): 0.1 parts by weight

Comparative Example 3

Bisphenol A Type Epoxy Resin (EPIKOTE 828, manufactured by YUKA SHELL EPOXY KABUSHIKI KAISHA): 100.0 parts by weight Curing Agent (modified aliphatic polyamine) (FUJICURE 5003D, manufactured by FUJI KASEI KOGYO KABUSHIKI KAISHA): 30.0 parts by weight Curing Agent (modified alicyclic polyamine) (EPIKURE 113, manufactured by YUKA SHELL EPOXY KABUSHIKI KAISHA): 30.0 parts by weight Thixotropy Agent (silica fine particles) (AEROSIL R972, manufactured by NIPPON AEROSIL CO., LTD):

3.0 parts by weight

Lubricant (glass flake) (RCF-140, manufactured by NIPPON PLATE GLASS CO.,LTD):

2.0 parts by weight

After each of the adhesive compositions prepared in the above Examples 1–3 and Comparative Examples 1–3 was used as an adhesive agent in a process for repairing an existing old pipe, the results indicating the reversing/moving property of the lining tube in the existing pipe were obtained as shown in the following Tables 1 and 2.

In the following Table 1 and Table 2, ● means that a flexible lining tube was able to pass through three bent portions of an existing pipe, ○ means that a flexible lining tube was able to pass through two bent portions of an existing pipe, Δ means that a flexible lining tube was able to pass through only one bent portion of an existing pipe, X means that a flexible lining tube was unable to pass through even one bent portion of an existing pipe.

As will be understood from the following Table 1 and Table 2, when compared with the adhesive compositions of Comparative Examples 1–3, the adhesive compositions prepared in the Examples 1–4, have lower sliding resistance, thus ensuring a more satisfactory reversing/moving property of the lining tube in an existing pipe.

TABLE 1

| Example No. | Lubricant | Specific Gravity | Particle Diameter (μm) | Particle Shape | Content (%) | Viscosity (cP) | Thixotropy Index | Sliding Resistance (Kgf) | Movability of Lining Tube | Workability | Downward Flowability | Total Evaluation |
|---|---|---|---|---|---|---|---|---|---|---|---|---|
| 1 | TOSHIBA GLASS BEADS GB731 BPN | 1.46 | 18 | Spheroidal | 2.0 | 9240 | 1.33 | 1.8 | ○ | Δ | Δ | Δ |
| 2 | FERRITE FG | 0.40 | 6~200 | Spheroidal | 2.0 | 11000 | 1.33 | 1.5 | ● | ● | ○ | ● |
| 3 | SANKILITE Y-04 | 0.46 | 40~70 | Spheroidal | 2.0 | 10550 | 1.34 | 1.3 | ● | ● | ○ | ● |

TABLE 1-continued

| Example No. | Lubricant | Specific Gravity | Particle Diameter (μm) | Particle Shape | Content (%) | Viscosity (cP) | Thixotropy Index | Sliding Resistance (Kgf) | Movability of Lining Tube | Workability | Downward Flowability | Total Evaluation |
|---|---|---|---|---|---|---|---|---|---|---|---|---|
| 4 | FLOW BEADS FG801-NN | 0.94 | 10–20 | Spheroidal | 2.0 | 9800 | 1.42 | 1.1 | ○ | ● | ○ | ○ |

●: Excellent
○: Good
Δ: Acceptable
X: Not Acceptable

TABLE 2

| Example No. | Lubricant | Specific Gravity | Particle Diameter (μm) | Particle Shape | Content (%) | Viscosity (cP) | Thixotropy Index | Sliding Resistance (Kgf) | Movability of Lining Tube | Workability | Downward Flowability | Total Evaluation |
|---|---|---|---|---|---|---|---|---|---|---|---|---|
| 1 | PEARLITE | 0.17 | 1000 | Spheroidal | 2.0 | 2380 | 1.05 | 1.1 | Δ | X | X | X |
| 2 | EXPANCEL DE | 0.02 | 10–100 | Spheroidal | 5.0 | 248000 | 1.17 | 2.4 | X | X | ● | X |
| 3 | GLASS FLAKE RCF-140A | 0.54 | 45–300 | Flake | 2.0 | 12100 | 1.31 | 1.9 | X | ○ | X | X |

●: Excellent
○: Good
Δ: Acceptable
X: Not Acceptable

Further, as is understood from the above Table 1 and Table 2, the lubricants used in Examples 1–4 are different from those used in Comparative Examples 1–3 and have a relatively greater specific gravity and smaller particle size than those used in Comparative Examples 1–3. As a result, the adhesive compositions prepared in the Examples 1–4 were proved to be more effective in a process for repairing an existing pipe.

Now, an actual process for repairing an existing old pipe with the use of an adhesive composition according to the present invention, will be described in detail below with reference to FIGS. 1 and 5.

Referring to FIG. 1, a suction pump 5 is connected through a valve 4 to one end 31 of an existing old pipe 3 involving an elbow 1 and a socket 2.

At first, a leading pig 6 made of a resilient material having a diameter slightly larger than pipe inner diameter, is introduced into the pipe 3 through another open end 32. Then, a resin cassette 7 is attached to the open end 32 of the pipe 3, and a predetermined amount of the adhesive composition 8 prepared in any one of the examples 1–4 is introduced from the resin cassette 7 into the pipe 3 by virtue of a suction force produced from the suction pump 5.

Afterwards, the suction pump 5 is stopped, the resin cassette 7 is removed from the open end 32, a lining tube receiving/feeding apparatus 9 is attached to the open end 32 of the pipe 3. A predetermined length of a reversible lining tube 10 is reeled up and received in the apparatus 9, with one end of the tube 10 reversed and fixed within the apparatus 9 in a manner such that the lining tube 10 may be reversed into the existing pipe 3.

Subsequently, the suction pump 5 is operated again so that the leading pig 6 and the adhesive composition 8 are caused to move towards the open end 31 of the pipe 3, thus enabling the lining tube 10 to be reversed into and through the pipe 3 over the entire length thereof, In this way, the existing old pipe 3 may be lined with the lining tube 10.

Figure 2:
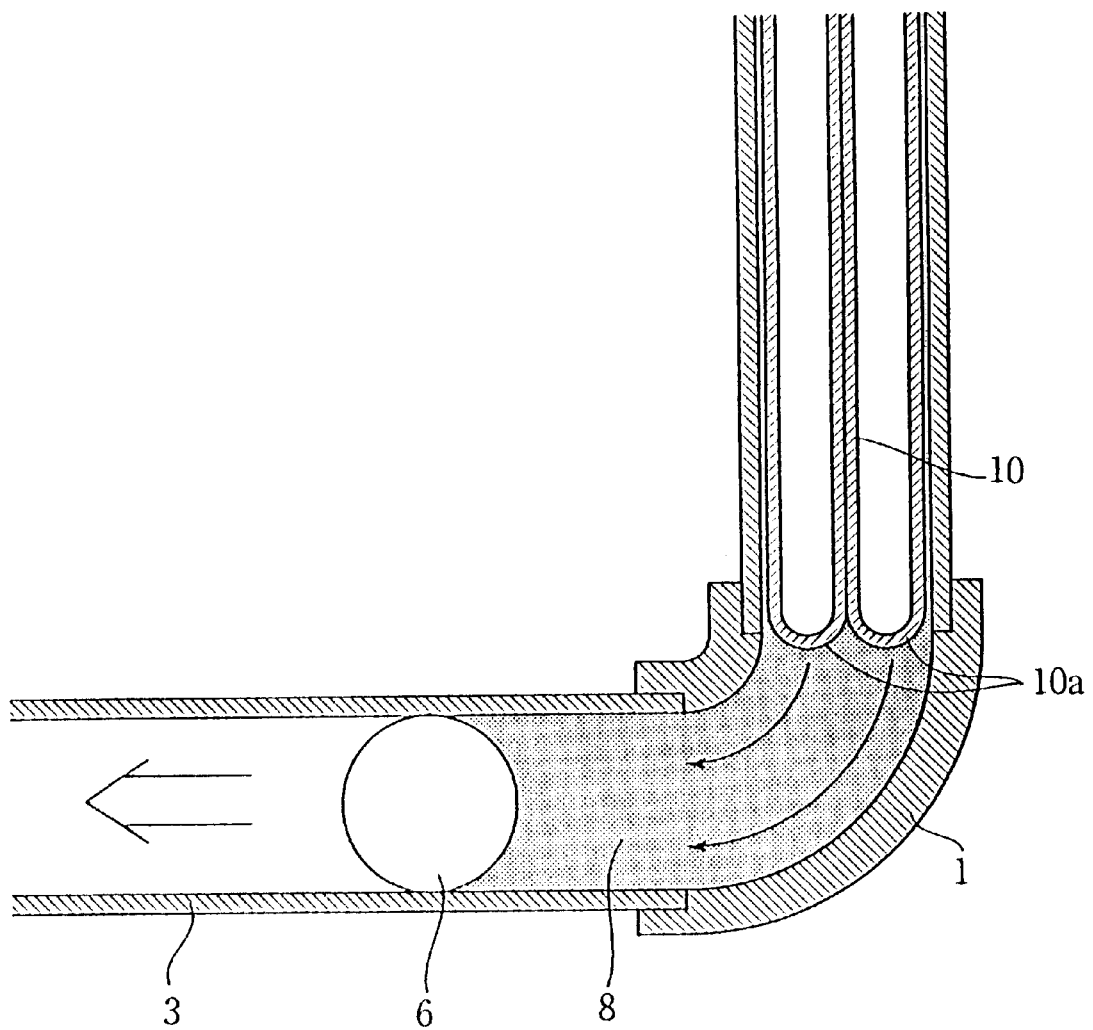
FIG. 2 is a cross sectional view showing in more detail the process for repairing an existing underground gas pipe by reversing a flexible lining tube into the pipe, and bonding the reversed lining tube on to the pipe internal wall using an adhesive composition of the present invention as an adhesive agent.
Figure 3:
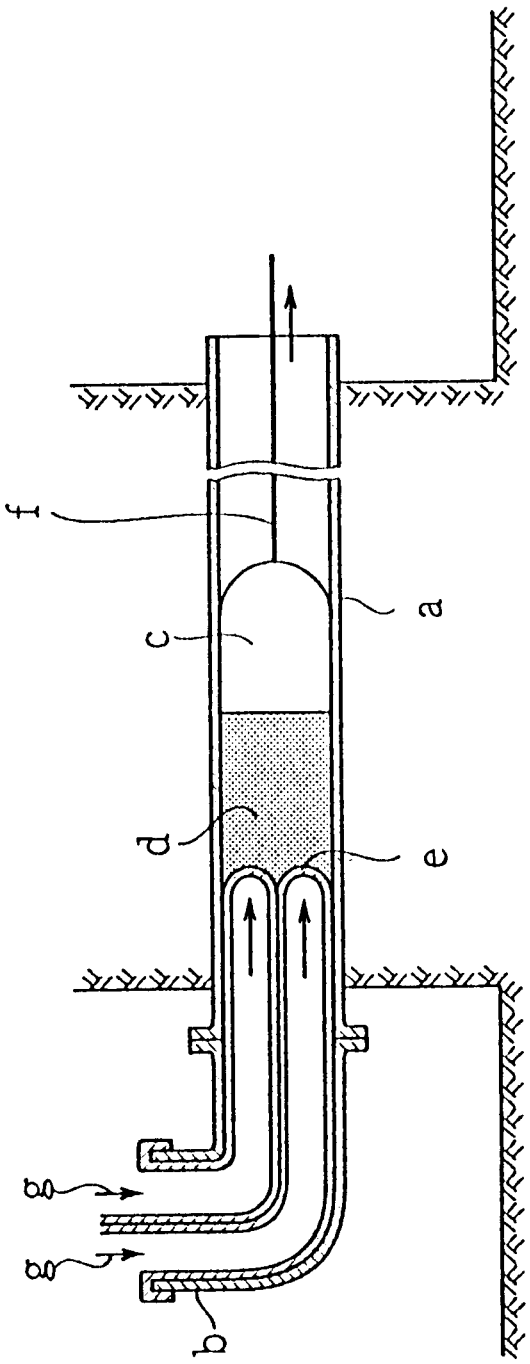
FIG. 3 is a cross sectional view showing a process for repairing an existing underground gas pipe by reversing a flexible lining tube into the pipe, and bonding the reversed lining tube on to the pipe internal wall using an adhesive agent of prior art.

Referring to FIG. 2, when the reversing portion 10a of the lining tube 10 arrives at a bent portion of the pipe such as an elbow 1, since the adhesive composition 8 of the present invention (prepared in any one of the above examples 1–4) has a reduced sliding resistance, the reversing portion 10a of the lining tube 10 will smoothly pass through the elbow 1 without being get stuck. In this way, with the continued operation of the suction pump 5, the leading pig 6, the adhesive composition 8 and the lining tube 10 can continue to move toward the open end 31 of the pipe 3, so that the existing old pipe 3 may be smoothly lined with the lining tube 10 without any difficulty.

Further, since the adhesive composition of the present invention (prepared in any one of the above examples 1–4) has a reduced sliding resistance, only a small suction force is needed to cause the leading pig 6 and the adhesive composition 8 to move towards the open end 31 of the existing pipe 3, thus enabling the lining tube 10 to be smoothly reversed into and through the pipe 3 over the entire length thereof, so as to be effectively bonded on to the internal surface of the existing old pipe 3.

Further, since the adhesive composition of the present invention (prepared in any one of the above examples 1–4) has only a reduced sliding resistance, the lining tube 10 can be smoothly reversed into and moved through the existing old pipe 3 over the entire length thereof. Thus, it is also possible even to dispense with a leading pig 6 without causing any trouble during the pipe repairing operation, thereby further simplifying a process of repairing an existing pipe.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of bonding a lining tube to an internal surface of a pipe, comprising:
    applying an adhesive composition to an internal surface of a pipe, said adhesive composition comprising:

a) an epoxy resin;
b) a thixotropy agent comprising silica fine particles;
c) a lubricant comprising spheroidal fine particles;
d) a curing agent comprising one or two substances selected from the group consisting of an aliphatic polyamine, an alicyclic polyamine, a modified polyamide amine, an aromatic polyamine and a polymercaptan, said curing agent being present in an amount sufficient to cure the epoxy resin; and
bringing a lining tube into contact with said adhesive composition.

2. The method as recited in claim 1 wherein said adhesive composition has a viscosity of 5000–50000 centipoise, a thixotropy index of 1.0–4.0 and a sliding resistance of 2.5 or less.

3. The method as recited in claim 1, wherein said adhesive composition has a thixotropy index of 1.0–2.0 and a sliding resistance of 1.5 or less.

4. The method as recited in claim 1, wherein said epoxy resin is a bisphenol A epoxy resin, a bisphenol F epoxy resin, or a mixture thereof.

5. The method as recited in claim 1, wherein said curing agent comprises an aliphatic polyamine or an alicyclic polyamine, or both.

6. The method as recited in claim 1, wherein said lubricant comprises spheroidal fine particles having an average diameter of 1000 $\mu$ or less.

7. The method as recited in claim 1, wherein said thixotropy agent is present in said adhesive composition in an amount of 0.1–10 parts by weight per 100 parts by weight of said epoxy resin, said lubricant is present in said adhesive composition in an amount of 1–10 parts by weight per 100 parts by weight of said epoxy resin, said lubricant having a specific gravity of 0.4 or more.

8. A method of bonding a lining tube to an internal surface of a pipe, comprising: adding a first composition to a second composition to form an adhesive composition,
said first composition comprising:
a) an epoxy resin;
b) a thixotropy agent comprising silica fine particles; and
c) a lubricant comprising spheroidal fine particles;
said second composition comprising:
b) a thixotropy agent comprising silica fine particles;
d) a curing agent comprising one or two substances selected from the group consisting of an aliphatic polyamine, an alicyclic polyamine, a modified polyamide amine, an aromatic polyamine and a polymercaptan, said curing agent being present in an amount sufficient to cure the epoxy resin;
applying said adhesive composition to an internal surface of a pipe; and
bringing a lining tube into contact with said adhesive composition.

9. The method as recited in claim 8, wherein said adhesive composition has a viscosity of 5000–50000 centipoise, a thixotropy index of 1.0–4.0 and a sliding resistance of 2.5 or less.

10. The method as recited in claim 8 wherein said adhesive composition has a thixotropy index of 1.0–2.0 and a sliding resistance of 1.5 or less.

11. The method as recited in claim 8, wherein said epoxy resin is a bisphenol A epoxy resin, a bisphenol F epoxy resin, or a mixture thereof.

12. The method as recited in claim 8, wherein said curing agent comprises an aliphatic polyamine or an alicyclic polyamine, or both.

13. The method as recited in claim 8, wherein said lubricant comprises spheroidal fine particles having an average diameter of 1000 $\mu$ or less.

14. The method as recited in claim 8, wherein said thixotropy agent is present in said adhesive composition in an amount of 0.1–10 parts by weight per 100 parts by weight of said epoxy resin, said lubricant is present in said adhesive composition in an amount of 1–10 parts by weight per 100 parts by weight of said epoxy resin, said lubricant having a specific gravity of 0.4 or more.

15. A method of bonding a lining tube to an internal surface of a pipe, comprising:
applying an adhesive composition to a lining tube, said adhesive composition comprising:
a) an epoxy resin;
b) a thixotropy agent comprising silica fine particles;
c) a lubricant comprising spheroidal fine particles;
d) a curing agent comprising one or two substances selected from the group consisting of an aliphatic polyamine, an alicyclic polyamine, a modified polyamide amine, an aromatic polyamine and a polymercaptan, said curing agent being present in an amount sufficient to cure the epoxy resin; and
bringing said adhesive composition on said lining tube into contact with an internal surface of a pipe.

16. The method of bonding a lining tube to an internal surface of a pipe, comprising:
adding a first composition to a second composition to form an adhesive composition, said first composition comprising:
a) an epoxy resin;
b) a thixotropy agent comprising silica fine particles; and
c) a lubricant comprising spheroidal fine particles;
said second composition comprising:
b) a thixotropy agent comprising silica fine particles;
d) a curing agent comprising one or two substances selected from the group consisting of an aliphatic polyamine, an alicyclic polyamine, a modified polyamide amine, an aromatic polyamine and a polymercaptan, said curing agent being present in an amount sufficient to cure the epoxy resin;
applying said adhesive composition to a lining tube; and
bringing said adhesive composition on said lining tube into contact with an internal surface of a pipe.

17. The method of bonding a lining tube to an internal surface of a pipe, comprising:
connecting a suction pump to a first open end of a pipe, and operating said suction pump so as to apply suction to said first open end of said pipe;
passing a leading pig through a second open end of said pipe, said leading pig having a diameter slightly larger than an inner diameter of said pipe;
introducing an adhesive composition into said pipe by virtue of said suction produced by said suction pump, said adhesive composition comprising:
a) an epoxy resin;
b) a thixotropy agent comprising silica fine particles;
c) a lubricant comprising spheroidal fine particles;
d) a curing agent comprising one or two substances selected from the group consisting of an aliphatic polyamine, an alicyclic polyamine, a modified polyamide amine, an aromatic polyamine and a polymercaptan, said curing agent being present in an amount sufficient to cure the epoxy resin;

discontinuing said operating of said suction pump;

reversing a front end portion of a lining tube into said pipe;

resuming said operating of said suction pump, thereby causing said leading pig and said adhesive composition to move toward said first open end of said pipe, thereby reversing a remaining portion of said lining tube into said pipe.

18. The method as recited in claim 17, wherein said thixotropy agent is present in said adhesive composition in an amount of 0.1–10 parts by weight per 100 parts by weight of said epoxy resin, said lubricant is present in said adhesive composition in an amount of 1–10 parts by weight per 100 parts by weight of said epoxy resin, said lubricant having a specific gravity of 0.4 or more.

19. A method of bonding a lining tube to an internal surface of a pipe, comprising:

introducing an adhesive composition into a pipe, said adhesive composition comprising:

a) an epoxy resin;

b) a thixotropy agent comprising silica fine particles;

c) a lubricant comprising spheroidal fine particles;

d) a curing agent comprising one or two substances selected from the group consisting of an aliphatic polyamine, an alicyclic polyamine, a modified polyamide amine, an aromatic polyamine and a polymercaptan, said curing agent being present in an amount sufficient to cure the epoxy resin; and reversing a lining tube into said pipe.

20. The method as recited in claim 19, wherein said thixotropy agent is present in said adhesive composition in an amount of 0.1–10 parts by weight per 100 parts by weight of said epoxy resin, said lubricant is present in said adhesive composition in an amount of 1–10 parts by weight per 100 parts by weight of said epoxy resin, said lubricant having a specific gravity of 0.4 or more.

* * * * *